United States Patent
Boyle et al.

(10) Patent No.: US 9,970,748 B2
(45) Date of Patent: May 15, 2018

(54) PALM-SIZE TIRE TREAD LASER MEASUREMENT DEVICE

(71) Applicant: TIRE PROFILES MOBILITY, LLC, Irving, TX (US)

(72) Inventors: David Boyle, Colleyville, TX (US); Roger H. Tracy, Chicago, IL (US)

(73) Assignee: Tire Profiles LLC, Irving, TX (US)

( * ) Notice: Subject to any disclaimer, the term of this patent is extended or adjusted under 35 U.S.C. 154(b) by 98 days.

(21) Appl. No.: 15/301,375

(22) PCT Filed: Apr. 3, 2015

(86) PCT No.: PCT/US2015/024214
§ 371 (c)(1),
(2) Date: Oct. 1, 2016

(87) PCT Pub. No.: WO2015/153954
PCT Pub. Date: Oct. 8, 2015

(65) Prior Publication Data
US 2017/0176176 A1  Jun. 22, 2017

Related U.S. Application Data

(60) Provisional application No. 61/974,643, filed on Apr. 3, 2014, provisional application No. 62/022,714, filed on Jul. 10, 2014.

(51) Int. Cl.
*G01M 17/02* (2006.01)
*G01B 11/22* (2006.01)
*A41D 19/00* (2006.01)

(52) U.S. Cl.
CPC .......... *G01B 11/22* (2013.01); *A41D 19/0027* (2013.01); *A41D 19/0037* (2013.01); *G01M 17/022* (2013.01); *G01M 17/027* (2013.01)

(58) Field of Classification Search
None
See application file for complete search history.

(56) References Cited

U.S. PATENT DOCUMENTS 6,789,416 B1    9/2004 Tracy et al.
2009/0000370 A1  1/2009 Lionetti et al.
(Continued)

FOREIGN PATENT DOCUMENTS

| KR | 1020030013906 A | 2/2003 |
| KR | 1020030061496 A | 7/2003 |
| WO | 2013156212 A1 † | 10/2013 |

*Primary Examiner* — Andre Allen
(74) *Attorney, Agent, or Firm* — Nexsen Pruet, LLC; Michael A. Mann

(57) ABSTRACT

A tire tread depth measurement system includes a scanner and smart phone that fit into the palm of a user either directly or attached to a glove. The technician obtains tread depth data by moving her hand holding the scanner over a tire profile. The scanner communicates with a nearby control box that uploads the data to a server for determination of tread depth, tire wear pattern and wheel alignment. The tire tread analysis is downloaded to the control box and reported to the technician via the smart phone. The smart phone is programmed to identify the vehicle and related information about it based on the license plate or vehicle identification number by interpreting the license number or VIN and interrogating various data bases via the internet. Wear and analysis results are forwarded for printing the entire report.

20 Claims, 12 Drawing Sheets

(56) References Cited

U.S. PATENT DOCUMENTS

| | | |
|---|---|---|
| 2009/0222973 A1† | 9/2009 | Merkle |
| 2012/0008148 A1† | 1/2012 | Pryce |
| 2013/0185005 A1† | 7/2013 | Petrucelli |
| 2015/0362439 A1* | 12/2015 | Bayram ............... G01N 22/02 |
| | | 324/639 |
| 2016/0029006 A1* | 1/2016 | Zoken ................. G01B 11/24 |
| | | 348/50 |
| 2017/0052021 A1* | 2/2017 | Rhoades ............. G01B 11/22 |

* cited by examiner
† cited by third party

PALM-SIZE TIRE TREAD LASER MEASUREMENT DEVICE

CROSS REFERENCE TO RELATED APPLICATIONS

This application is a 35 U.S.C. § 371 U.S. national phase entry of International Application No. PCT/US2015/024214 having an international filing date of Apr. 3, 2015, which claims the benefit of U.S. Provisional Patent Application No. 61/974,643 filed Apr. 3, 2014, and U.S. Provisional Patent Application No. 62/022,714 filed Jul. 10, 2014, each of which is incorporated herein by reference in its entirety.

BACKGROUND

Tire tread depth is a safety issue. Worn tires have little traction especially on wet roads. Visual inspection or tire tread depth measurements may be made to determine the amount of tread left on a tire. However, tires may wear down to an unsafe level unless checked with sufficient frequency so that the rate of tire tread wear can be properly ascertained for a good prediction of the end of useful tire service.

Tire tread depth also affects fuel economy. Vehicular fuel economy is directly affected by resistance to movement, including rolling resistance. Underinflated tires increase rolling resistance and increase fuel use per unit distance. Tire tread depth measurements and wear patterns reveal issues in maintaining tire inflation at proper levels.

There are several devices for measuring tire tread depth including handheld devices and drive-over devices. These are useful and convenient but there remains a need for improvement.

SUMMARY OF THE INVENTION

The present invention is a tire tread depth measurement system that includes several components. It includes a hand-held tread depth scanner; that is, a scanner that is held in the palm of the hand either directly or attached to a glove worn on or attached to the hand of the user. The present invention may also include a smart phone. The technician holding the scanner can obtain data related to tire tread depth for each tire on a car or truck by moving the scanner over the running surface of the tire. The tread depth scanner carried by the hand of the user communicates with a controller located in a nearby tire replacement facility which then uploads the scanned data to the "cloud" where it may be accessed for calculation of tread depth and a determination as to the character of tire wear. These results are forwarded to a printer in the tire replacement facility and, optionally, to a smart phone operated by the tire technician or, alternatively, to the primary components of the smart phone installed with the scanner.

The hand held scanner is programmed with a software application enabling the technician to identify the vehicle. For example, the technician may take an image of the license plate of the vehicle or scan the vehicle identification number bar code using a camera on the smart phone or one installed directly on the scanner or on the glove to which the scanner is attached. The license plate text is read and then associated with the vehicle identification number via access to a database that relates plate text to identification numbers. The vehicle identification number is then associated with the vehicle make, model, year, and factory-installed tire size. The vehicle identification number, when obtained using the license plate, and the other information are all available by automatic interrogation of various databases accessible via the internet. This information is also forwarded to a controller that associates the information with the tire tread depth data when that data is transmitted to cloud-based software for analysis.

The tire tread analysis is downloaded from the cloud to the controller and an reported to the technician to share with the owner of the vehicle. The full results of that analysis and record are also forwarded to a printer to print a paper copy of the tire report. The full report, in addition to including numerical tread wear results, contains images of the actual measured tire profile against a new tire profile so the extent of wear and pattern of wear are easily perceived. Furthermore, the report provides an analysis of the wheel alignment, increased braking distance in view of tire wear, and administrative information such as time, date, dealer name, and so forth.

The use of the user's palm as a platform for the tire tread measurement device improves productivity over so-called hand-held devices because the technician holding it can readily sense the surface of the tire, and can position the tread depth measuring device with respect to that surface, and move across the surface of a tire more efficiently with the hand than with a probe on the end of a handle. The palm of the hand can quickly conform the scanner to the surface of the tire in a basic manual inspection. The palm-held scanner also avoids the need to drive a car over a tread measuring scanner, which, while quick and efficient in certain applications, requires movement of the car.

The combination of a tire tread depth measurement device and a smart phone, in a first embodiment, takes advantage of the compact telecommunication capabilities, graphical user interface, programmed internal processor, as well as a digital camera of the smart phone, to facilitate the acquisition, storage, processing, and communication of data so that results are obtained and reporting quickly. In the second embodiment, the key features of the smart phone are incorporated into the scanner itself. Furthermore, the present tread depth measurement system requires only modest training to use.

These and other features and their advantages will be apparent to those skilled in the art of tire tread depth measurement from a careful reading of the Detailed Description of Embodiments, accompanied by the following drawings.

BRIEF DESCRIPTION OF THE DRAWINGS

In the figures.

Figures 4A, 4B:
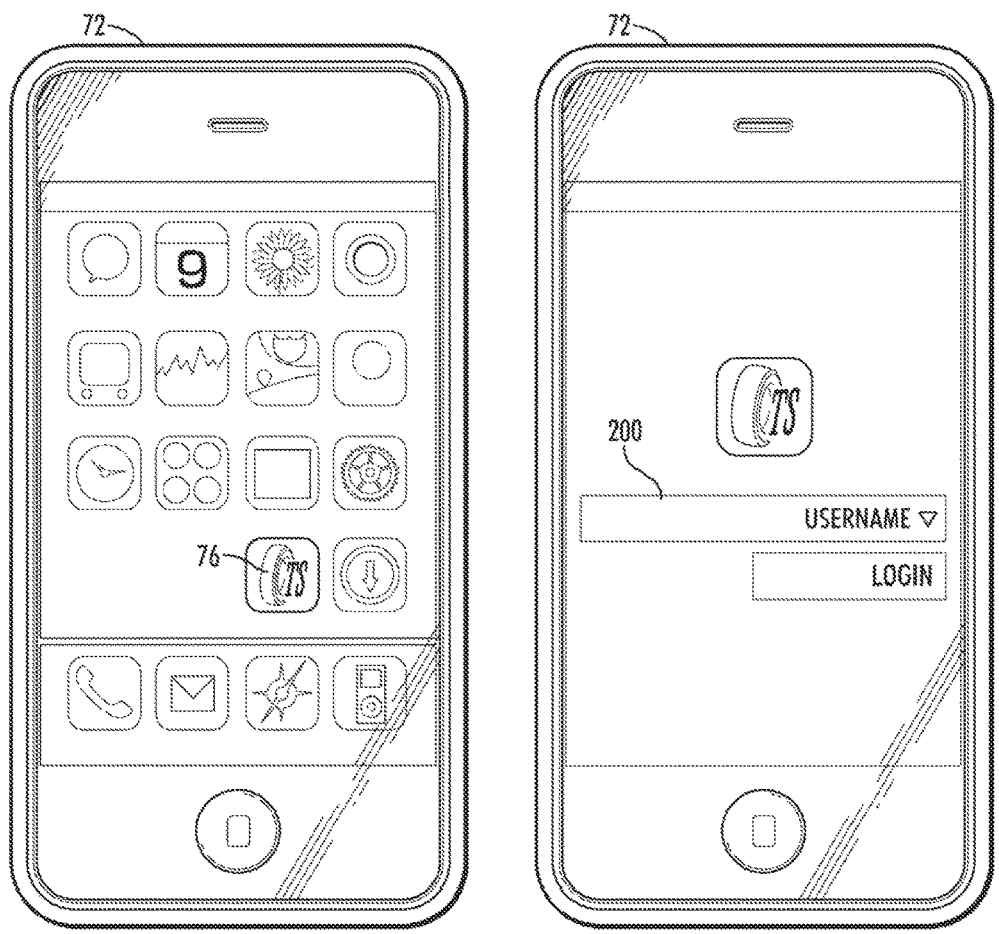
FIGS. 4A-4E are a series of views of a mobile device such as a smart phone, according to an embodiment of the present invention, showing the icon 76 for the present tire tread depth measurement software application resident on the mobile device in FIG. 4A; the software application user login page in FIG. 4B; the optional choices for the technician supported by the launched software application in FIG.
Figure 4C:
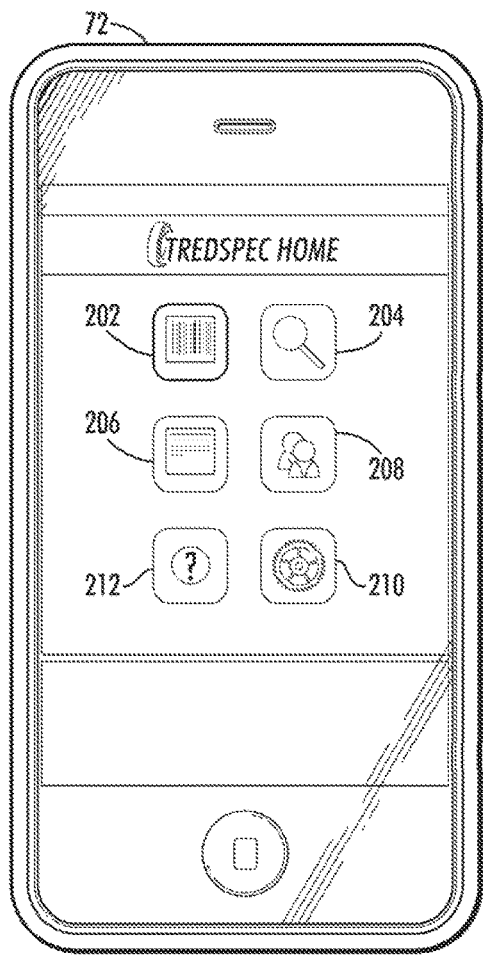
Figure 4D:
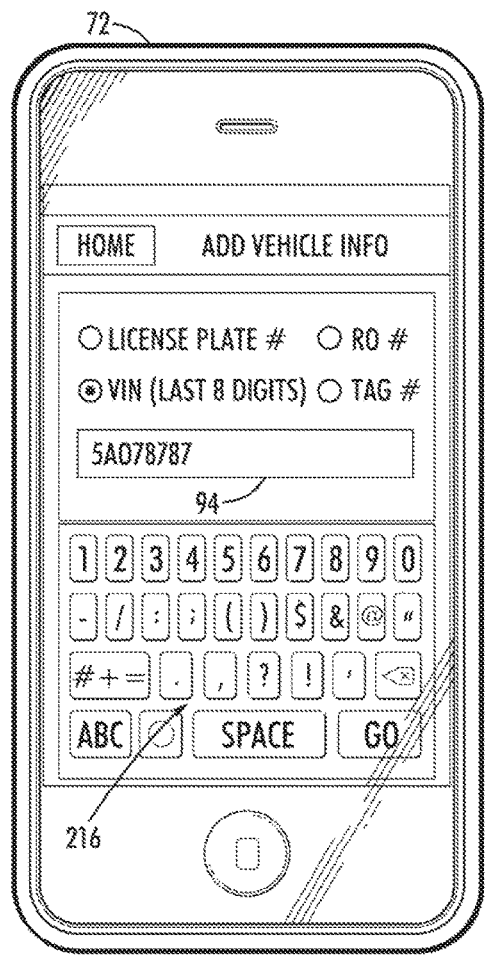
Figure 4E:
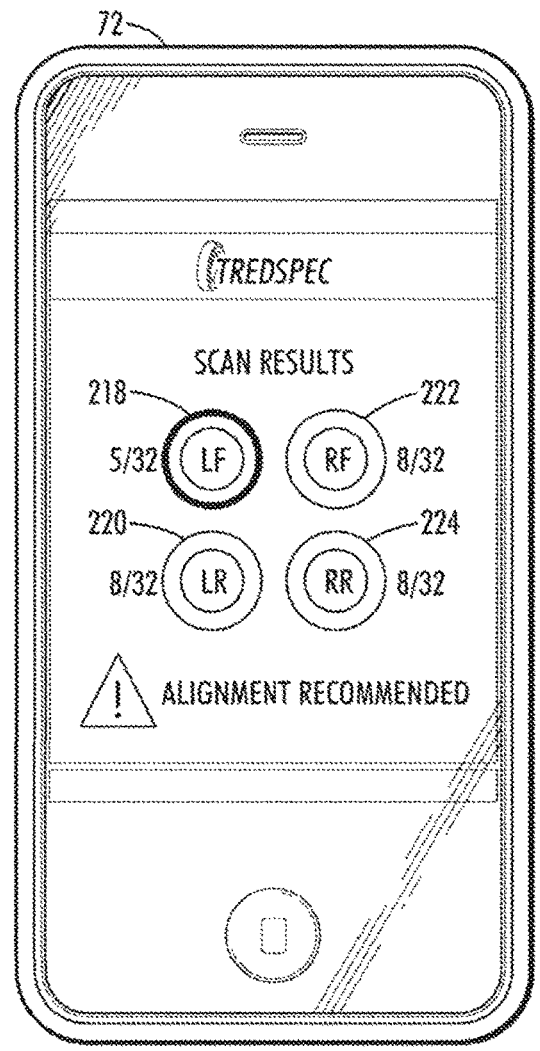
Figure 5:
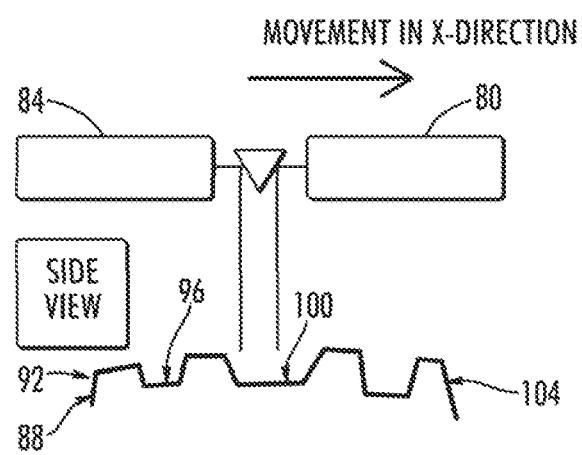
Figure 6:
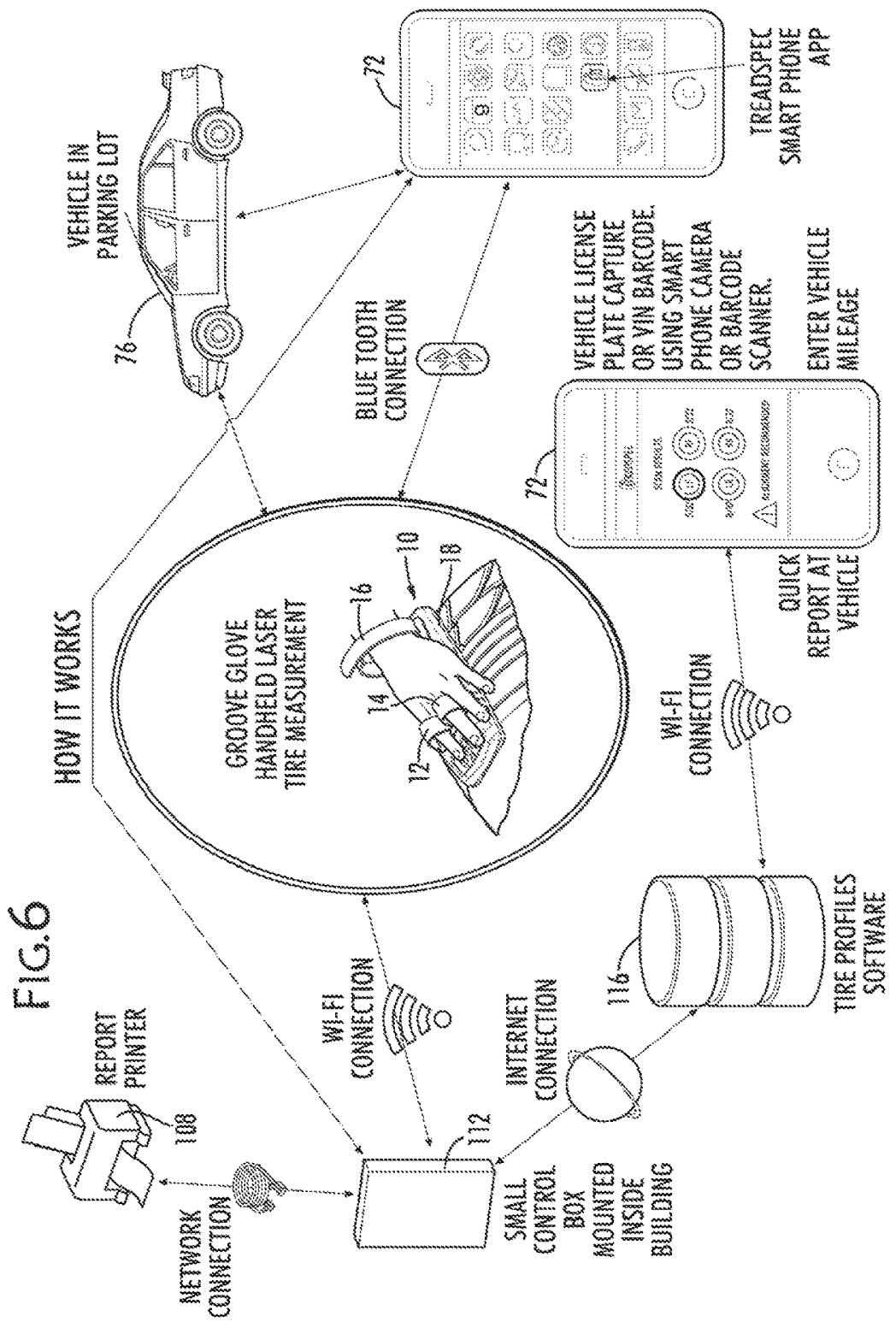
Figure 7:
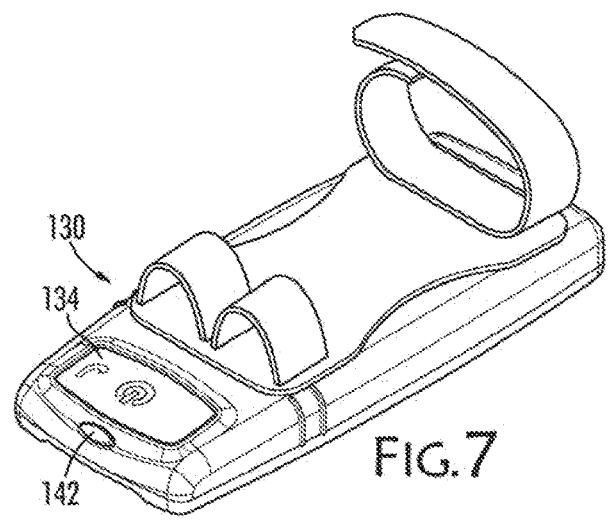
Figures 8A, 8B:
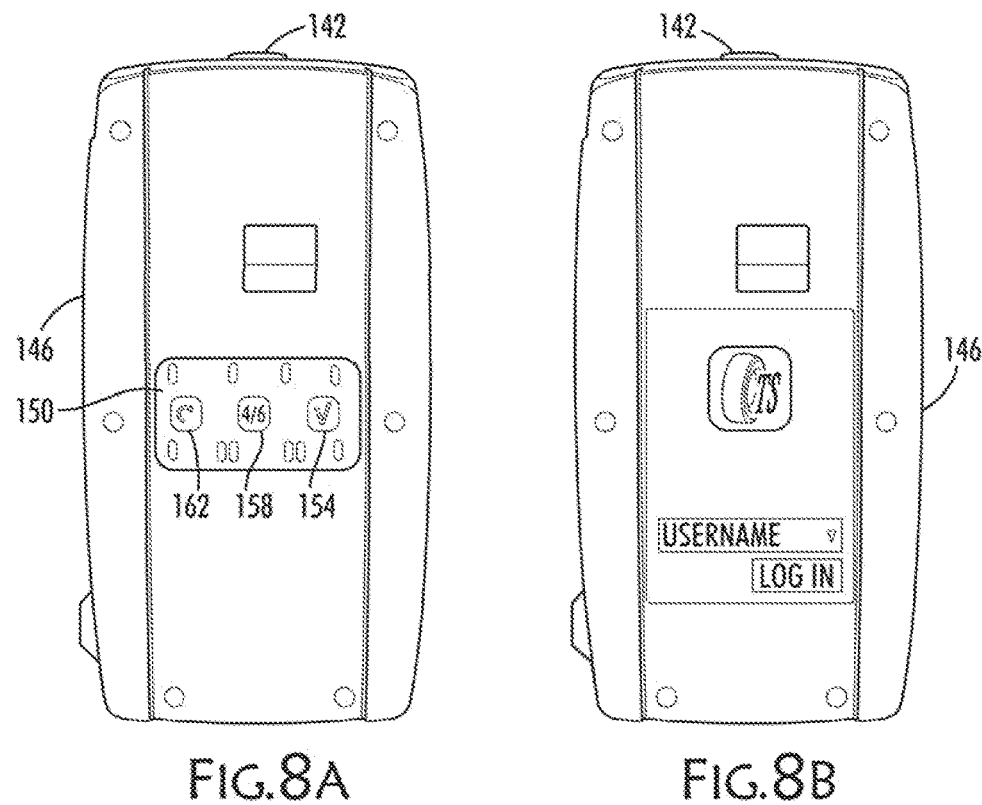
Figure 9A:
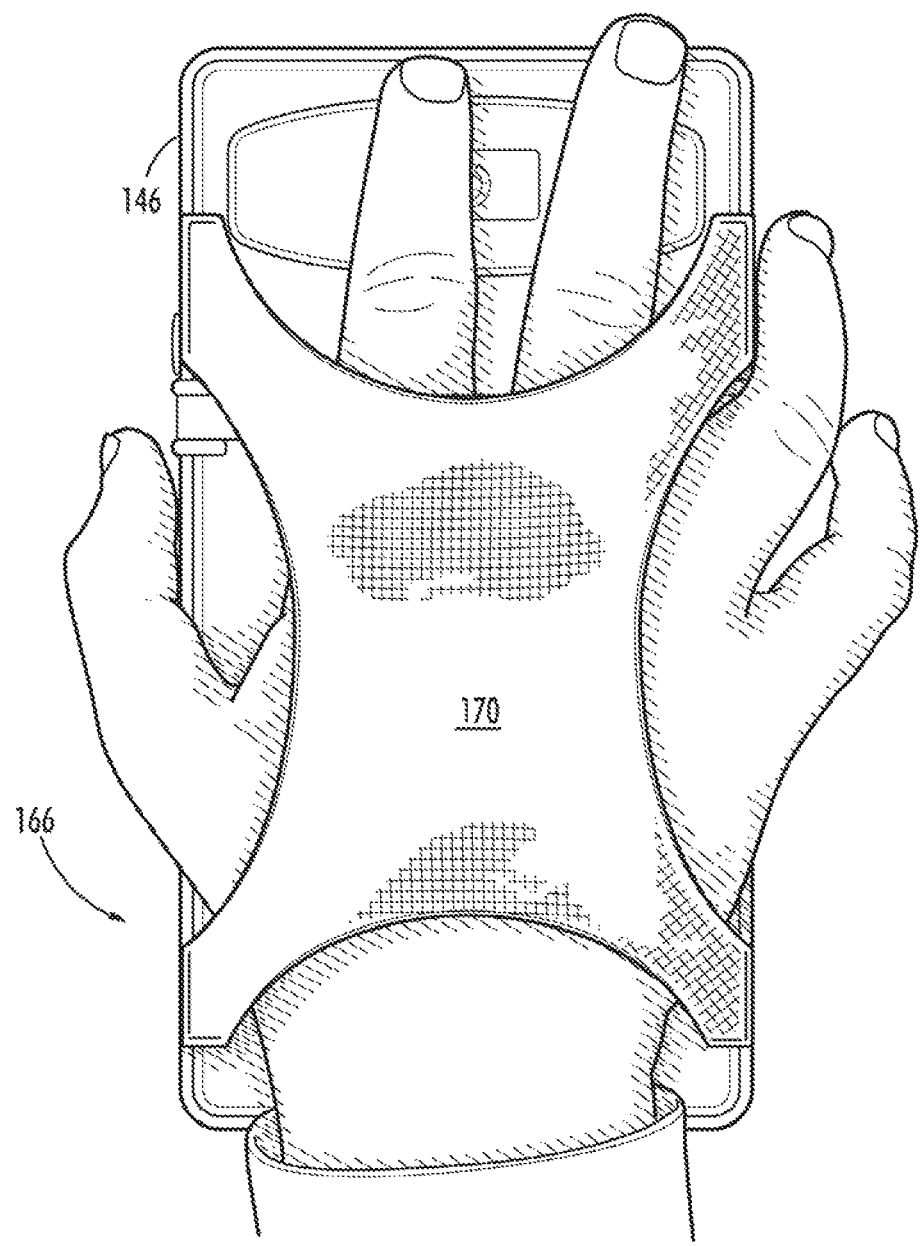
Figure 9B:
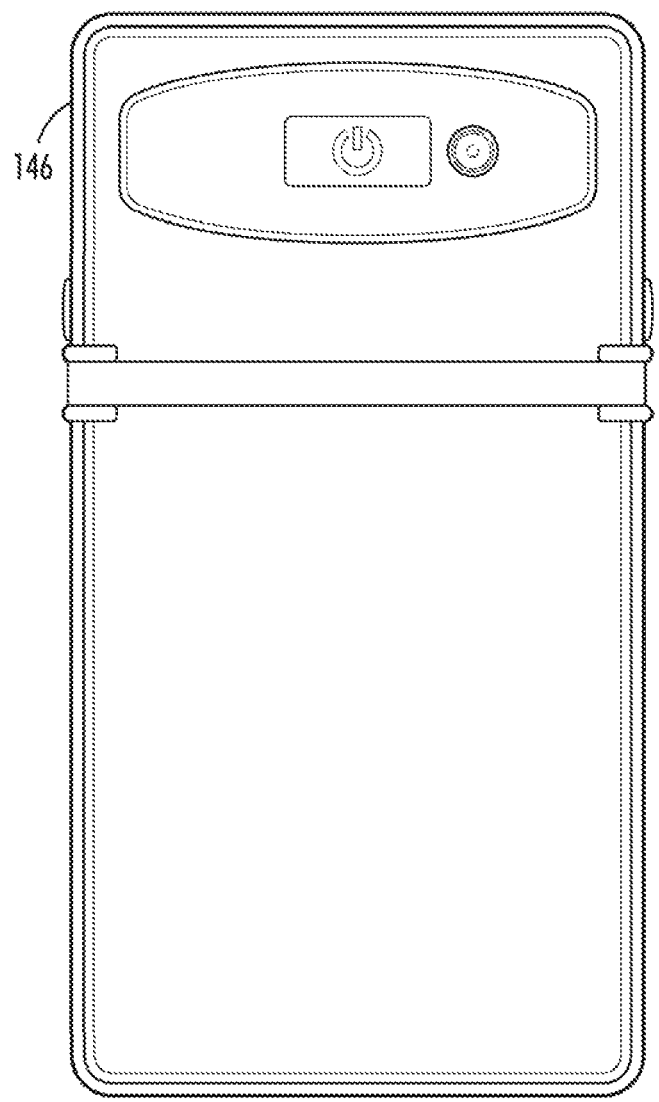
Figure 10:
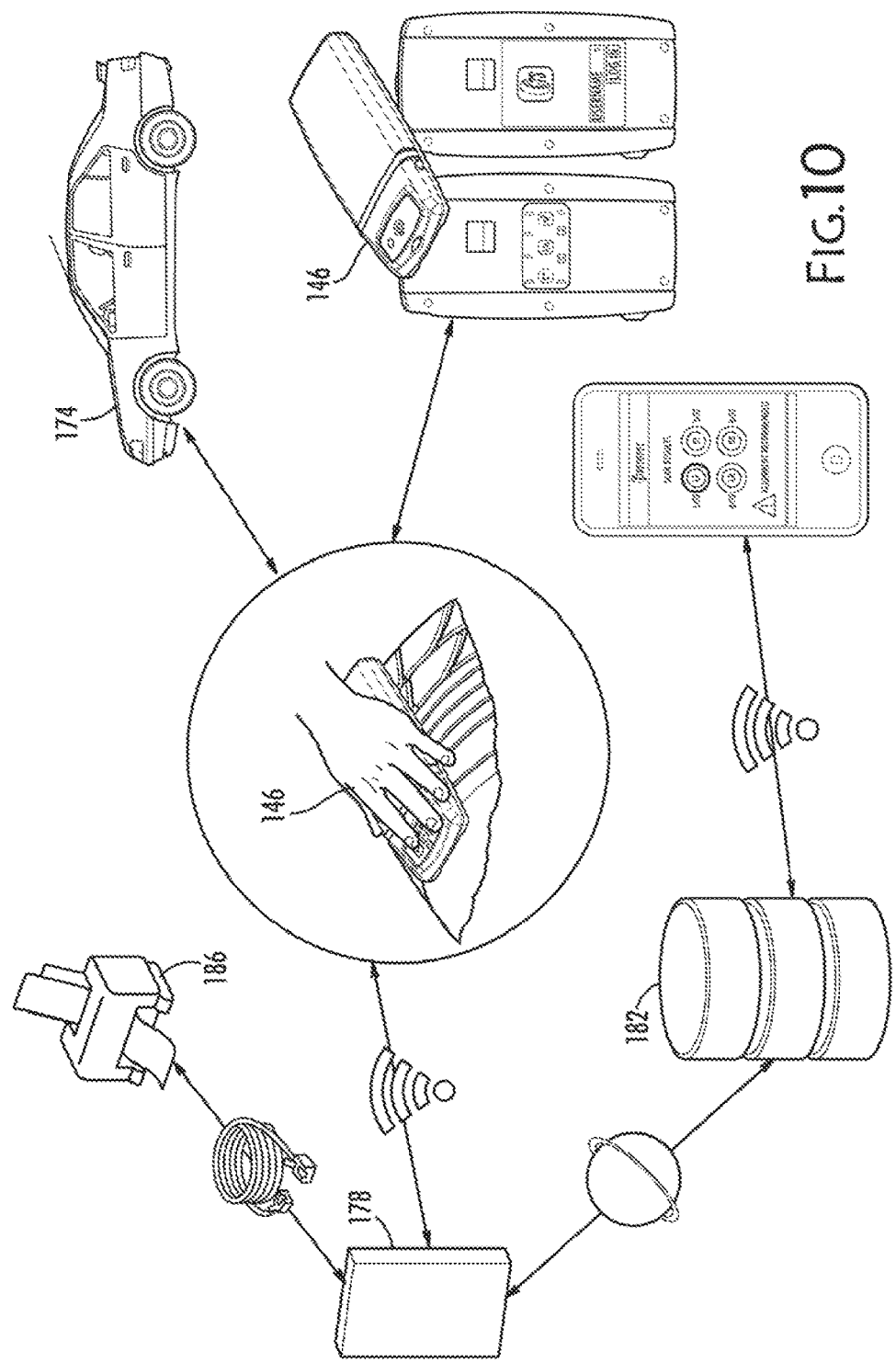

4C; the user interface for manual data entry in FIG. 4D; and, in FIG. 4E, the tread wear report provided by the software application;

FIG. 5 is a schematic diagram of a part of the tread depth measurement process and the tire profile;

FIG. 6 is a diagram showing the components of the present method and the flow of information among them, according to an embodiment of the present invention;

FIG. 7 is a perspective view of an alternative embodiment of the glove, according to the present invention;

FIGS. 8A and 8B show bottom view of two alternative embodiments of the glove illustrated in FIG. 7;

FIGS. 9A and 9B show an alternate embodiment of a top view of scanner and the back view of the scanner that is held directly in the palm of the user, according to an embodiment of the present invention; and FIG. 10 illustrates the operation of the alternative embodiment of the present scanner, according to an embodiment of the present invention.

DETAILED DESCRIPTION OF PREFERRED EMBODIMENTS

The present tread depth measuring device is a scanner dimensioned to be held in the palm of a hand, and in one embodiment, is attached to a glove. The tread depth measuring device serves as a handle, platform and positioning device for two single-point triangulation lasers. The measuring device may also carrt a camera, Wi-Fi telecommunications equipment, a processor and a user interface.

The term hand held or palm held is used to mean a device that is placed in the palm of the hand and covers the palm, is easily operated by the fingers and may be mounted to a glove worn on the hand. The term is intended to describe a device operated specifically as if part of the hand because of how it relates to the palm of the hand because it uses the developed hand eye coordination intrinsic to users to position and maneuver the device. Its form and position in use is intended to take advantage of the natural dexterity of the human hand in manipulating the functional elements carried by the measuring device over the surface of a tire. As the technician moves his or her hand across the running surface of the tire, the tread depth is scanned by lasers in the device which acquire data representing the distance between the surface of the tire and the bottom of the tire grooves. The hand is naturally adapted for movement that conforms to the tire surface and readily detects its orthogonal curves, orienting naturally to find the right one to traverse.

Figure 1:
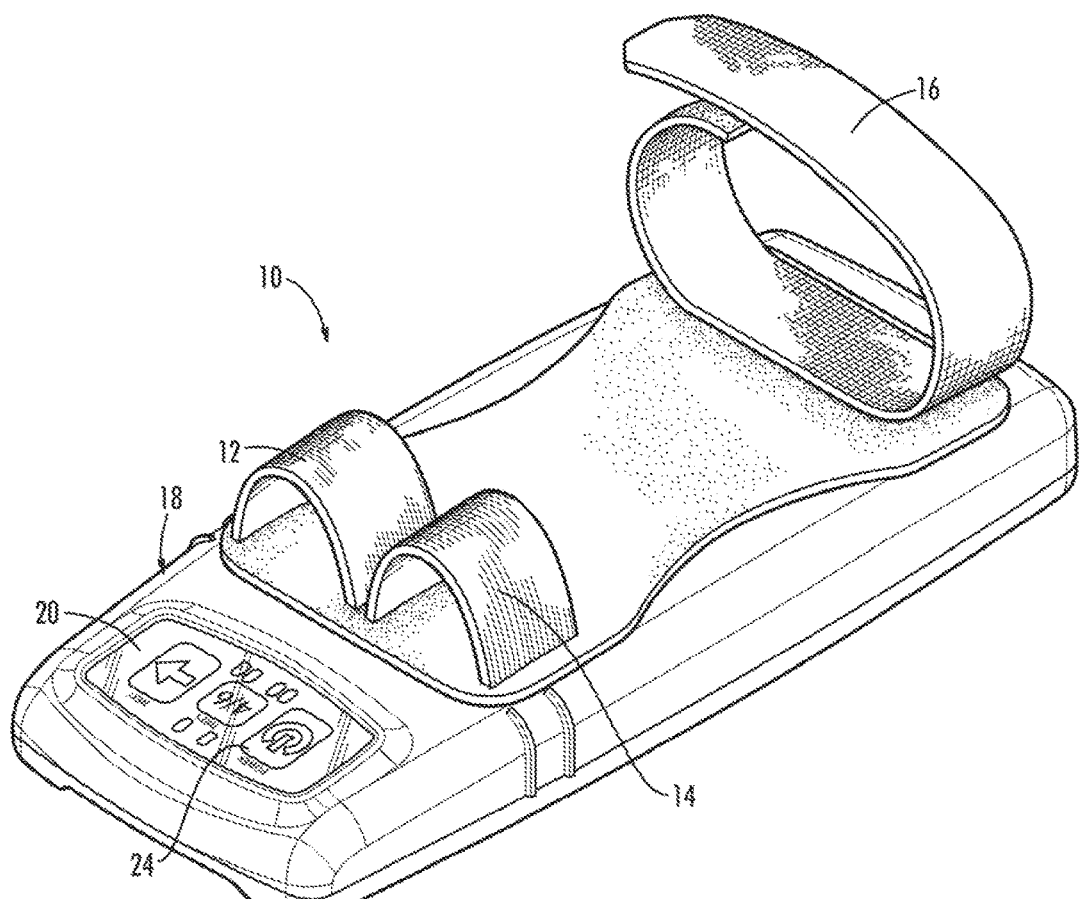
FIG. 1 is a perspective top view of an embodiment of a glove for use in measuring tread depth, according to an embodiment of the invention.

FIG. 1 shows an embodiment of the present measuring device as part of a glove 10 when viewed in perspective from the top left as opposed to a view of the palm of glove 10. Glove 10 may have finger loops 12, 14, and a wrist strap 16 on the back that secure a tread depth scanner 18 to the user's palm and also position the user's fingers with respect to a user interface 20 on the back of glove 10 for operating scanner 18.

Figure 2:
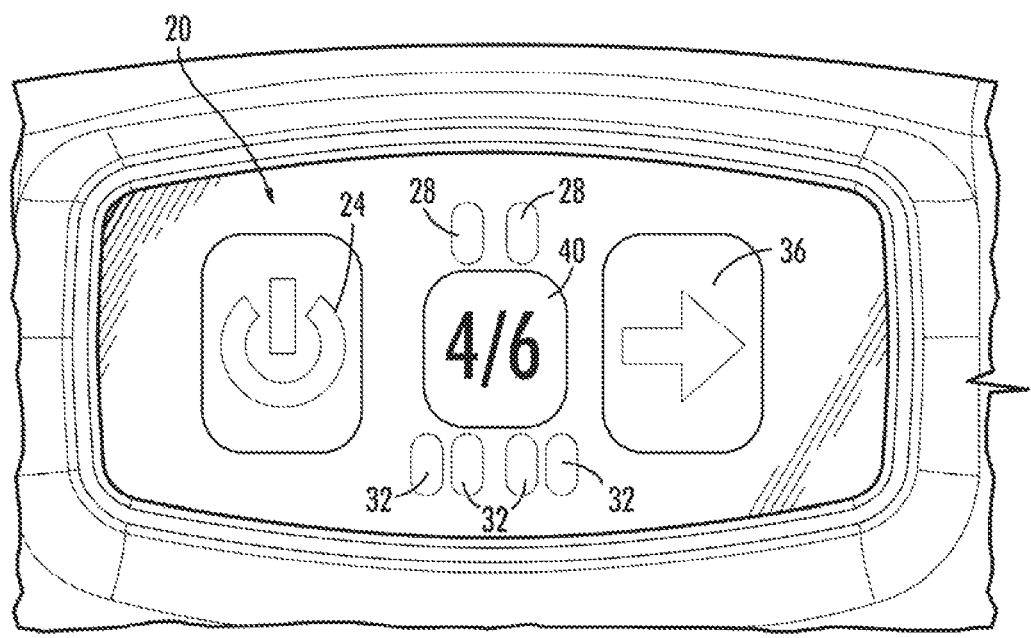
FIG. 2 is top view of the user interface of the glove of FIG. 1 with tire tread measuring capability, according to an embodiment of the invention.

FIG. 2 shows an enlarged view of user interface 20. User interface 20 has a start button 24 on the left that, when pressed, starts tread depth scanner 18 through a cycle. Button 24 will be operated by the technician's index finger while wearing glove 10 on the right hand. Button 24 may be a "press and hold" button that powers the scanner 18 on when pressed and held, and stops them only when released. A measurement cycle begins by pressing button 24 and holding it while the technician passes his hand that is wearing glove 10 over the running face of tire, that is, from side to side, orthogonal to the circumference of the tire, and ends when button 24 is released.

As best seen in FIG. 2 Interface 20 also has tire-indicating LEDs 28 (light emitting diodes) used as icons for selecting front tires, and LEDs 32, as icons for selecting rear tires. The additional two LEDs 32 permit scanning of two additional rear tires if the vehicle is a six-tire vehicle. LEDs 28 and 32 may be oval in shape to represent the appearance of tires. Note that the relative positions of LEDs 28 and LEDs 32 measurements correspond to the locations of tires of a vehicle, that is, the front left tire of the vehicle may be associated with the top left LED 28 so that the data recorded when LED 28 is selected and start button 24 is pressed corresponds to the front left tire on the vehicle and can be presented as a tread depth measurement associated with the correct tire. Similarly, when the second LED 32 from the right is selected and start button 24 is pressed, the user should be measuring the right rear tire of a four-tire vehicle.

A button 36, carrying a right-pointing arrow lights each of the tire LEDs 28, 82 in a rotating sequence. Each press of button 36 lights the next LED 28, 32. Button 36 may conveniently be activated by the ring finger when wearing glove 10 on the right hand. Interface 20 will not automatically advance from one tire LED 28, 32, to the next unless button 36 is first released and then pressed.

The button labeled 4/6, button 40, is a toggle button that enables the technician to select between a four-tire and a six-tire configuration by repeatedly pressing button 40. Both LEDs 28 and two LEDs 32 flash when four-tire configuration is selected by toggling button 40, and, after toggling button 40 again, all six LEDs 28, 32, flash to indicate a six-tire vehicle has been selected. Another press of button 40 returns to a four-tire configuration, and, once again, both LEDs 28 and the middle two of four LEDs 32 flash.

Figure 3:
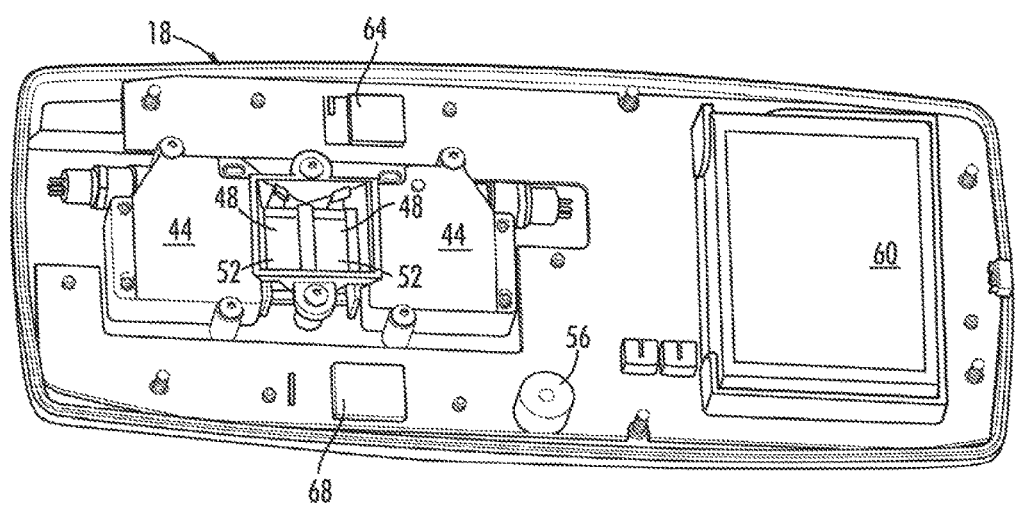
FIG. 3 is an interior view of a tire depth scanner showing the major components thereof, according to an embodiment of the present invention.

FIG. 3 shows the major components inside tread depth scanner 18. Inside scanner 18 is a pair of lasers 44 that direct their light to their respective mirrors 48 and thence through glass windows 52. A beeper 56 confirms scanning has started and again when a cycle has been completed, and corresponds to the pressing and releasing, respectively, of start button 24 of user interface 20. Batteries 60 provide electrical power to energize lasers 44 and for communication of received data wirelessly through both radio modem transmitter 64 such as that manufactured by Bluetooth Sig., Inc. and sold under the trademark BLUETOOTH, and a wireless transmitter 68 operating under IEEE standard 802.11 such as that certified by the Wi-Fi Alliance.

FIGS. 4A-4E illustrate five successive screen images of a smart phone 72. A smart phone is defined as a hand held computer with telecommunications capability, processor, battery, and a graphical user interface, such as IPHONE manufactured by Apple, Inc., and smart phones using the ANDROID operating system as manufactured by Samsung Electronics Company Ltd. A software application is installed on smart phone 72, preferably an application that operates on any brand of smart phone, to enable smartphone 72 to communicate data and display results according to the present method. Turning on smart phone 72 will cause an icon 76 for that application to appear among other applications resident on the processor of smart phone 72 so that a technician may launch the software in accordance with the user interface protocols of the particular brand of smart phone 72 used.

Once the application is launched, a login page (FIG. 4B) page appears with a text box 200 for identification of the technician using the present software. After logging in, the technician may select at FIG. 4C from among several options to identify the vehicle 202 the tires of which are to be measured for tread depth, including scanning a vehicle identification number barcode or license plate using the smart phone camera. The technician may alternatively access recent activities 204, search for previous measurements 206, search on previous users 208 of the application, and adjust settings 210, for example, changing from metric to English units or choice of Wi-Fi network. There is also a "help" button 212.

In FIG. 4D, the manual input screen that has a text box 94 for entering either the license plate or vehicular identification number using a keyboard 216 of smart phone 72 as shown.

FIG. 4E illustrates the display of tread depth measurement results on smart phone 72. The tread depth of each tire is provided adjacent to each tire icon 218, 220, 222, and 224. Each tire icon 218, 220, 222, 224, is labeled for its position on the vehicle: LF for left front, LR for left rear, RF for right front, and RR for right rear for a four-tire configuration. Each tire icon 218, 220, 222, 224, is ringed with a color as a cue to the status of each tire, using the familiar colors of green, yellow, and red for satisfactory, caution, and replace, respectively. The colors correspond to ranges of tread depth.

In addition, if the tires are misaligned, that information is provided with a warning sign below icons 218, 220, 222, 224.

Scanning a tire with a handheld device requires information as to the location of the device at each point across the tire profile in order to obtain the tread depth as a function of position as scanner moves across the running surface of the tire.

Micro-Electro-Mechanical Systems (MEMS) could provide data for measuring that movement, but this would introduce errors, especially when the movement is slow. Alternatively, a camera or an optical mouse could be used to measure movement, with the tire itself as a reference. In this case the measured value would depend on the distance between the camera or mouse and the tire with its accompanying error. Moreover, image processing would be necessary.

An optical mouse might also provide the measurement but would require special optics and illumination in order to work at a reasonable distance, such as at least a couple of mm.

The present approach uses two triangulation laser sensors and signal processing. Two laser distance sensors 80, 84, are moved across a tire profile 88 and the distance measured is recorded. As they are moved across profile 88, each sensor 80, 84, reaches surface feature 92, 96, 100, 104, 106 at different times. That time differential can be measured. If the distance between sensors 80, 84 is known, the instantaneous velocity of the sensors 80, 84, can be calculated at each feature 92, 96, 100, 104: at the beginning of the tire 92, at every groove 96, 100, and 104.

The velocity curve of the hand holding the scanner, with or without glove 10, moving across the tire can be reconstructed from this information. From the velocity curve, the X-position of every measured feature can be calculated. An inertial pack consisting of an accelerometer and gyroscope may be incorporated into the unit to adjust for tremors or jerky hand movements of the operators hand during tread scan. Their output can correct the data for these movements mathematically to produce more accurate results. Both the accelerometer and gyroscope require careful factory calibration For the embodiment in which scanner 18 is carried by glove 10, a technician assigned to measure tread depth on the tires of a vehicle 76 dons glove 10, inserting the index and middle fingers of the right hand into loops 12, 14, respectively, and fastening strap 16 to his wrist. By inspection, the technician determines that vehicle 76 has four tires and toggles button 40 until both LEDs 28 and two of four LEDs 32 flash.

The technician enters the license plate number or the vehicle identification number (VIN), or both, into smart phone 72, and vehicle mileage into the text window on its input screen (FIG. 4D). Next, the technician selects a tire to measure and uses right arrow button 36 on user interface 20 to scroll through until the corresponding LED 28, 32 lights. The technician then positions tread depth scanner 18 on the inside shoulder of the first tire with glove 10 on his hand, and presses and holds start button 24 on user interface 20 on back of glove 10 and moves his gloved hand across the tire from the inside shoulder to the outside shoulder in 2 to 3 seconds as a measurement point is recorded for every feature on tire surface. The technician then proceeds to each tire in turn to measure the tread depth of each of the other tires of vehicle 76 by repeating this procedure.

Importantly, the use of a glove 10 as a platform for a scanner 18 allows the technician to measure tread depth with one hand and, more importantly, to take advantage of the palm of the hand's inherent ability to find an object and assess the shape of a surface, particularly in low light such as is the case in a wheel well. The hand, bare or gloved, is sensitive to surface features and shape. That surface-sensing capability defers to the technician's eyes when the technician is using a hand held device. In low light conditions, however, such as in a wheel well, the technician's eyes are challenged to position the handheld device accurately. In the present device, the use of the palm as the position for scanner 18 preserves the hand's function as a sensor of location. Carrying scanner 18 on glove 10 may protect the technician's hand from injury and dirt but without decreasing sensitivity.

As shown in FIG. 6, the tread depth data output from scanner 18, transmitted via wireless transmission to a nearby controller 112, such as Wi-Fi or Bluetooth. Wi-Fi is preferred for range and reliability. In the embodiment of glove using a cell phone, Bluetooth is the preferred connection. The vehicle identification information is used by smart phone 72 to access and interrogate various databases for information about the vehicle, such as make, model, year, and factory-installed tire size. This information is also forwarded by radio modem transmission to controller 112. The data regarding tread depth and the vehicle information is forwarded from controller 112 to analytical software resident on remote servers that are in the "cloud" for analysis and results. The cloud and cloud computing refer to a model of network computing where a program or application runs on a connected server or servers rather than on a local computing device, but, in cloud computing, the computing process may run on one or many connected computers at the same time and therefore provides greater flexibility and speed. Here, use of cloud computing servers 116 is also assures that each location where tread depth is being measured using the present system is always operating using the current software version.

Servers 116 transmit reports back to controller 112 and smart phone 72. The report provided to smart phone 72 is explained above in connection with FIG. 4E. However, the report transmitted to controller 112 and then printed by printer 108 contains more information and presents the results graphically. For example, the administrative information of time, date, facility name and location are provided along with the vehicle's make, model, year, and tire size.

Tread depth is shown graphically in the report as a profile of the worn tire along with the tire profile of a new tire that that particular vehicle for ease of comparison. Tire misalignment is identified.

FIG. 7 illustrates an alternative embodiment of the present glove, generally indicated by reference number 130 one that is similar to that shown in FIG. 1. Glove 130 is very similar from the top to glove 10 but user interface 134 may be different, limited to a power button 138 to turning on laser distance sensors 80, 84. Glove 130 also has a camera 142 mounted on the tip so that the technician of glove 130 can simply point to an object such as a license plate or vehicle identification number and press camera button to capture an image. Glove 130 may alternatively have a pair of opposing power buttons 144 located on the sides 140 of glove 130 that must be held simultaneously to activate laser sensors 80, 84. If glove 130 is dropped, the user will have release the opposing buttons 144 and thereby provide some protection for the lasers which are more likely to be damaged if left on when dropped.

FIGS. 8A and 8B are two alternative embodiments of a scanner 146. A first one, illustrated in FIG. 8A shows a second user interface 150 similar to interface 20 in that it has a start button 154, a 4/6 button 158 to select four- or six-tire configurations for measurement, and a tire selection button 162 that scrolls from LED to LED of the four or six tire configuration to select the particular tire for measurement. The second embodiment, illustrated in FIG. 8B, replaces the user interface of the smart phone 72 with one on scanner 146, so that the technician can log in and vehicle identification can be done by scanner 146 in a manner similar to that explained above in connection with smart phone 72. Scanner 146 will access the internet via Wi-Fi to identify the make, model, year, and tire size of the vehicle. The interior components of scanner 146 in either embodiment are otherwise the same as those of scanner 18, as described above, for performing tread depth measurements.

FIG. 9A illustrates an alternative embodiment for the back of glove 130 to that shown in FIG. 7. Instead of finger loops 12, 14 and strap 16, a glove 166 has a strap 170 that covers the back of the palm of the user holding scanner 130 to the hand. Alternatively, as seen in FIG. 9B, scanner 146 may have no strap 170 but be held by the palm of the user's hand. User interface is near the user's fingers as is a camera button 168 for obtaining a photographic image of a license plate or vehicle identification number. In this embodiment, a pair of opposing power buttons 172 located on the sides of scanner 146 must be depressed simultaneously to activate laser sensors 80, 84. If scanner 146 is dropped, the user will have released his grip on the opposing buttons 172, thereby deactivating the power to lasers 80, 84, to provide some modicum of protection for them. Lasers 80, 84, are more likely to be damaged if left on when dropped.

In FIG. 10, the operation of this second embodiment of the present system is shown schematically. A vehicle 174 enters a facility where tire treads are inspected to determine if the tires are worn to the point where they should be replaced. A technician, carrying scanner 146 in his palm and already logged in, scans an image of either the license plate or the vehicle identification code of vehicle 174 by pressing button 168 of camera 142 for use in interrogating databases such as CARFAX and EXPERIAN on the internet for make, model, year and tire size of vehicle 174. Scanner 164 then scans each tire of vehicle 174 in the order which the technician selects them. The tread depth data and vehicle information are paired and forward to a controller 178 in the facility and then sent by internet connection to cloud-based servers 182 for analysis and generation of two reports. Both reports are returned to controller 178 where one is forwarded to scanner 146 for display to the technician and the second one, a more detailed report is sent to a printer 186 where a copy is printed for the owner of vehicle 174. The report may be sent to any part of the system anywhere in the world for storage, analysis and further action.

In the foregoing embodiments, of course, scanner 18, 146, may be operated with either the left or right hand and the user interface may be reversed so that the scan button can be used by those who are left-handed. Also, the display of tire condition can be done in different ways or with different colors to reflect the condition of the tires. Those skilled in tire tread depth measurement will appreciate that many other modifications and substitutions may be made to the embodiments described herein without departing from the spirit and scope of the present invention, which is defined by the appended claims.

What is claimed is:

1. A tire tread depth measuring system for measuring tread depth across a profile of a tire, comprising:
(a) a glove having a palm and an opposing back;
(b) a tread depth scanner carried on said palm of said glove, said scanner configured to collect a series of measurements representing the distance between said scanner and tire profile from said scanner, said scanner producing data related to depth of tread across said tire profile when said glove is moved across said tire profile and said tread depth scanner is collecting said series of measurements; and
(c) a user interface for operating said tread depth scanner, said user interface carried by said glove, said user interface including a start/stop button, and wherein, when said start/stop button is pressed and said user, wearing said glove on a hand of said user, moves said glove with said tire tread depth scanner over a tire tread, said tread depth scanner scanning said tire profile to measure said tread depth and collecting data related to said tread depth of said tire profile as said glove is moved.

2. The tire tread depth measuring system as recited in claim 1, wherein said user interface further comprises a button for said user to indicate the identity of each tire of plural tires of a vehicle selected to be scanned so that, when a profile of said selected tire is scanned, said data is associated with said identity of said each tire.

3. The tire tread depth measuring system of claim 1, wherein said user interface is carried on said back of said glove.

4. The tire tread depth measuring system of claim 1, wherein said scanner is carried on said palm of said glove.

5. The tire tread depth measuring system as recited in claim 3, further comprising a camera carried by said glove and programmed to capture an image of a license plate or a vehicle identification number to associate with said series of measurements.

6. The tire tread depth measuring system as recited in claim 1, further comprising:
(a) a smart phone in electrical communication with said tread depth scanner and configured to receive said data; and
(b) a server in communication with said smart phone, said smart phone receiving said data from said tread depth scanner and forwarding said data to said server for a tread depth analysis.

7. The tire tread depth measuring system as recited in claim 6, further comprising a printer in communication with said server for printing the results of said tread depth analysis.

8. The tire tread depth measuring system as recited in claim 6, further comprising a printer in communication with said smart phone.

9. The tire tread depth measuring system as recited in claim 1, wherein said glove has a wrist strap and finger loops.

10. A tire tread depth measuring system for measuring tread depth across a profile of a tire, comprising:
(a) a tread depth scanner dimensioned to be held within the palm of a user and having two laser distance sensors, each laser distance sensor of said two laser distance sensors arranged to sequentially measure distances to said tire across a profile of said tire, said tread depth scanner recording distance measurements as a function of time for said each laser distance sensor, said each laser distance sensor producing data related to tread depth across a profile of said tire; and
(b) a user interface carried by said tread depth scanner, said user interface including a start/stop button, and wherein, when said start/stop button is pressed and said user moves said tread depth scanner over a tire profile, said tread depth scanner being held in the palm of said user as said palm with said tread depth scanner held therein is moved by said hand of said user across said tire, said tread depth scanner scanning said tire tread to measure said tread depth and produce said data related to said tread depth for said profile.

11. The tire tread depth measuring system as recited in claim 10, wherein said scanner has plural digital storage locations, and wherein user interface carries buttons for selecting a data storage location of said plural storage locations corresponding to a tire of a vehicle to be scanned so that, as said profile of said each tire is scanned, said data produced by said tread depth scanner is entered into said data storage location corresponding to said tire.

12. The tire tread depth measuring system as recited in claim 10, further comprising a camera carried by said tread depth scanner, said user interface enabling said user to capture an image with said camera of a license plate or a vehicle identification number of said vehicle in order to associate said image with said data.

13. The tire tread depth measuring system as recited in claim 10, further comprising:
(a) a smart phone carried by said tread depth scanner and configured to receive said data from said two laser distance sensors; and
(b) a server remote from said tread depth scanner, said smart phone receiving said data from said two laser distance sensors and forwarding said data to said server for a tread depth analysis based on said data.

14. The tire tread depth measuring system as recited in claim 13, further comprising a printer in operational connection with said server for printing the results of said tread depth analysis.

15. A method for measuring the tread depth of a tire, said method comprising the steps of:
(a) providing a tire tread depth scanner with two laser distance sensors, said tread depth scanner dimensioned to be carried in the palm of a hand of a user, and a smart phone carried by said tread depth scanner and having a user interface for operating said tire tread depth scanner;
(b) inputting at least one of a license plate number and a vehicle identification number (VIN) into said smart phone;
(c) using said smart phone, interrogating remote databases for information associated with said license plate number or with said vehicle identification number regarding said make, model, year, and factory-installed tire size of said vehicle;
(d) using said hand of said user, placing said tread depth scanner on a shoulder of a tire, said tire tread depth scanner held in said palm of said user, so said tire tread depth scanner is positioned on said shoulder;
(e) activating said scanner;
(f) moving said tread depth scanner in said palm of said hand of said user across a tire profile while said laser distance sensors output data;
(g) calculating tread depth of said tire across said tire profile from said data output by said two laser distance sensors;
(h) analyzing said tread depth for tire wear patterns and wheel alignment; and
(i) reporting said analysis of tire wear and wheel alignment.

16. The method of claim 15, wherein said tire tread depth scanner is moved across said tire profile in less than three seconds.

17. The method of claim 15, wherein said smart phone includes a camera and further comprising the step of capturing an image of said license plate number or said vehicle identification number by said camera of said smart phone.

18. The method of claim 15, wherein said data obtained by said tire tread depth scanner is forwarded to a controller for uploading to a remote server for calculating and analyzing tread depth and tire wear.

19. The method of claim 18, wherein said controller sends said tread depth and tire wear to a printer for printing a report.

20. The method of claim 18, wherein said controller sends said tread depth and tire wear to said smart phone for displaying a report on said user interface.

* * * * *